(12) United States Patent
Sharma et al.

(10) Patent No.: US 10,580,020 B2
(45) Date of Patent: Mar. 3, 2020

(54) METHODS AND SYSTEMS FOR CUSTOMER CHURN PREDICTION

(71) Applicant: Conduent Business Services, LLC, Dallas, TX (US)

(72) Inventors: Avinash Sharma, Bangalore (IN); Narendra Annamaneni, Ananthapur (IN); Divanshu Gupta, Bangalore (IN); Geetha Manjunath, Bangalore (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 702 days.

(21) Appl. No.: 14/810,508

(22) Filed: Jul. 28, 2015

(65) Prior Publication Data

US 2017/0032391 A1 Feb. 2, 2017

(51) Int. Cl.
  *G06Q 30/02* (2012.01)
  *G06Q 50/00* (2012.01)
(52) U.S. Cl.
  CPC ..... *G06Q 30/0202* (2013.01); *G06Q 30/0204* (2013.01); *G06Q 50/01* (2013.01)
(58) Field of Classification Search
  None
  See application file for complete search history.

(56) References Cited

U.S. PATENT DOCUMENTS

| | | | | |
|---|---|---|---|---|
| 6,049,599 A * | 4/2000 | McCausland | ......... | H04M 15/00 379/111 |
| 7,110,997 B1 * | 9/2006 | Turkel | ................ | G06F 16/2465 707/713 |
| 8,265,992 B1 | 9/2012 | Seshadri et al. | | |
| 8,804,929 B2 | 8/2014 | Phadke et al. | | |
| 2007/0156673 A1 * | 7/2007 | Maga | ...................... | G06Q 30/02 707/999.005 |
| 2009/0099920 A1 * | 4/2009 | Aharoni | ................. | G06Q 30/02 705/14.26 |
| 2009/0138304 A1 * | 5/2009 | Aharoni | ................. | G06Q 30/02 705/7.33 |

(Continued)

OTHER PUBLICATIONS

Kiss, "Identification of Influencers—Measuring influence in customer networks," 2008, Decision Support Systems, vol. 46, pp. 233-253.*

(Continued)

*Primary Examiner* — Ivan R Goldberg
(74) *Attorney, Agent, or Firm* — Jones Robb, PLLC

(57) ABSTRACT

A method and a system are provided for customer churn prediction. The method includes creating a graph comprising a plurality of nodes and a plurality of edges. At least one edge of the plurality of edges in the graph connects more than two nodes of the plurality of nodes. Each of the plurality of nodes represents a customer. Thereafter, a similarity matrix representative of a similarity between each of a plurality of customers is determined based on the graph. Further, the similarity matrix is decomposed into a first matrix and a second matrix. A third matrix is determined based on the first matrix, the second matrix, and a scaling parameter. The third matrix is utilized to identify a set of potential churn customers from the plurality of customers. Thereafter, the set of potential churn customers is presented on a user-computing device.

22 Claims, 8 Drawing Sheets

(56) References Cited

U.S. PATENT DOCUMENTS

| | | | | |
|---|---|---|---|---|
| 2009/0192809 | A1* | 7/2009 | Chakraborty | G06Q 10/00 705/348 |
| 2010/0332270 | A1* | 12/2010 | Richter | G06Q 10/04 705/319 |
| 2011/0169833 | A1* | 7/2011 | Basak | G06T 11/20 345/440 |
| 2012/0053990 | A1* | 3/2012 | Pereg | G06Q 10/08 705/7.31 |
| 2013/0117278 | A1* | 5/2013 | Martens | G06Q 20/4016 707/748 |
| 2013/0211873 | A1* | 8/2013 | Varadarajan | G06Q 50/01 705/7.28 |
| 2013/0279672 | A1* | 10/2013 | Mohan | G06Q 10/0635 379/133 |
| 2014/0111304 | A1* | 4/2014 | Hashim-Waris | G06Q 30/0235 340/5.7 |
| 2014/0114722 | A1* | 4/2014 | Mohan | G06Q 30/0201 705/7.29 |
| 2014/0143332 | A1* | 5/2014 | Garg | H04L 67/306 709/204 |
| 2014/0379924 | A1* | 12/2014 | Das | H04L 47/72 709/226 |

OTHER PUBLICATIONS

Archambault, ChurnVis: Visualizing Mobile Telecommunications Churn on a Social Network with Attributes, 2013, IEEE/ACM International Conference on Advances in Social Networks Analysis and Mining, pp. 894-901.*

Huang, "An effective hybrid learning system for telecommunication churn prediction," 2013, Expert Systems with Applications, vol. 40, pp. 5635-5647.*

Li, "Telecom Customer Churn Prediction Method Based on Cluster Stratified Sampling Logistic Regression," 2014 International Conference on Software Intelligence Technologies and Applications, pp. 282-287.*

Richter, "Predicting customer churn in mobile networks through analysis of social groups," 2010, In Proceedings of the 2010 SIAM international conference on data mining, pp. 732-741.*

Ma, "Mining Social Networks Using Heat Diffusion Processes for Marketing Candidates Selection," 2008, Proceedings of the 17th ACM conference on Information and Knowledge Management, pp. 233-242 (Year: 2008).*

Chen, "Building Comprehensible Customer Churn Prediction Models: a Multiple Kernel Support Vector Machines Approach," 2011, IEEE, ICSSSM11, pp. 1-4 (Year: 2011).*

Zhou, "Social Influence Based Clustering and Optimization over Heterogeneous Information Networks," Jul. 2015, ACM Transactions on Knowledge Discovery from Data, vol. 10, No. 1, Article 2 (Year: 2015).*

Anton, "Web Caching for Database Applications with Oracle Web Cache," 2007, ACM, In SIGMOD Conference, pp. 594-599 (Year: 2007).*

Verbeke, "Social network analysis for customer churn prediction," 2014, Applied Soft Computing, vol. 14, pp. 431-446 (Year: 2014).*

Zhang, "Predicting Customer Churn by Integrating the Effect of the Customer Contact Network," 2010, IEEE, In Proceedings of 2010 IEEE International Conference on Service Operations and Logistics, and Informatics, pp. 392-397 (Year: 2010).*

Verbeke, "Building comprehensible customer churn prediction models with advanced rule induction techniques," 2011, Expert Systems with Applications, vol. 38, pp. 2354-2364 (Year: 2011).*

Verbeke, Wouter "New insights into churn prediction in the telecommunication sector: A profit driven data mining approach." European Journal of Operational Research 218.1 (2012): 211-229.

Sindhwani, Vikas, and S. Sathiya Keerthi. "Newton methods for fast solution of semi-supervised linear SVMs." Large scale kernel machines (2007): 155-174.

Kirui, Clement, et al. "Predicting Customer Churn in Mobile Telephony Industry Using Probabilistic Classifiers in Data Mining." International Journal of Computer Science Issues (IJCSI) 10.2 (2013).

Arthur D. Szlam, Mauro Maggioni, Ronald R. Coifman: Regularization on Graphs with Function-adapted Diffusion Processes. Journal of Machine Learning Research 9: 1711-1739, 2008.

Wei Liu, Shih-Fu Chang: Robust multi-class transductive learning with graphs. CVPR: 381-388, 2009.

Dengyong Zhou, Jiayuan Huang, Bernhard Schölkopf: Learning with Hypergraphs: Clustering, Classification, and Embedding. NIPS: 1601-1608, 2006.

* cited by examiner

| NODE (CUSTOMER) | EDGE E1 (AGE 20-30) | EDGE E2 (AGE 30-40) | EDGE E3 SERVICE TYPE (VOICE) | EDGE E4 SERVICE TYPE (DATA) |
|---|---|---|---|---|
| V1 | 1 | 0 | 0 | 0 |
| V2 | 1 | 1 | 0 | 0 |
| V3 | 0 | 1 | 0 | 0 |
| V4 | 0 | 1 | 1 | 0 |
| V5 | 0 | 1 | 1 | 1 |
| V6 | 0 | 0 | 1 | 1 |
| V7 | 0 | 0 | 0 | 1 |
| V8 | 0 | 1 | 0 | 1 |

FIG. 4

METHODS AND SYSTEMS FOR CUSTOMER CHURN PREDICTION

TECHNICAL FIELD

The presently disclosed embodiments are related, in general, to customer management systems. More particularly, the presently disclosed embodiments are related to methods and systems for customer churn prediction.

BACKGROUND

Customer churn prediction is one of many problems faced by all organizations, both in product as well as service sectors. One or more factors that may lead to customer churn include influence of churned customers on the already existing customers, internal factors of the organizations such as, quality of service/offering, lack of customer engagement strategies, and external factors such as, low cost offering from market competitors.

As organizations have control over the internal factors, therefore, it is easy to determine a remedy for the internal factors. However, determining a remedy for external factors, on which the organization does not have control, is a difficult and a nontrivial task. Additionally, determining the influence of churned customers on existing customers remains a challenge.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method to predict customer churn associated with a service of an organization. The method creates a graph that comprises of a plurality of nodes and a plurality of edges. In an embodiment, at least one edge of the plurality of edges in the graph connects more than two nodes of the plurality of nodes. In an embodiment, each of the plurality of nodes in the graph represents a customer. The method further determines a similarity matrix representative of a similarity between each of a plurality of customers, represented by the plurality of nodes, based on the graph. The method decomposes the similarity matrix into a first matrix and a second matrix. The method further determines a third matrix based on the first matrix, the second matrix, and a scaling parameter. In an embodiment, information pertaining to a set of churner customers from the plurality of customers is received from a user-computing device. In an embodiment, the set of churner customers correspond to the set of churner customers from the plurality of customers, who have left the service during a pre-defined time interval. The method further creates a fourth matrix based on the information pertaining to the set of churner customers. In an embodiment, the fourth matrix comprises a first value or a second value assigned to the plurality of customers. Based on the third matrix and the fourth matrix, the method further presents a set of potential churner customers on the user-computing device.

According to embodiments illustrated herein, there is provided a system that comprises of an application server configured to predict customer churn associated with a service of an organization. The application server further comprises of one or more processors configured to create a graph that comprises of a plurality of nodes and a plurality of edges. In an embodiment, at least one edge of the plurality of edges in the graph connects more than two nodes of the plurality of nodes. In an embodiment, each of the plurality of nodes in the graph represents a customer. The one or more processors are further configured to determine a similarity matrix representative of a similarity between each of a plurality of customers, represented by the plurality of nodes, based on the graph. The one or more processors are further configured to decompose the similarity matrix into a first matrix and a second matrix. The one or more processors are further configured to determine a third matrix based on the first matrix, the second matrix, and a scaling parameter. In an embodiment, the one or more processors are further configured to receive information pertaining to a set of churner customers from the plurality of customers is received from a user-computing device. In an embodiment, the set of churner customers correspond to the set of churner customers from the plurality of customers, who have left the service during a pre-defined time interval. The one or more processors are further configured to create a fourth matrix based on the set of churner customers. In an embodiment, the fourth matrix comprises of a first value or a second value assigned to the plurality of customers. The one or more processors are further configured to present the set of potential churn customers on the user-computing device based on the third matrix and fourth matrix.

According to embodiments illustrated herein, a non-transitory computer-readable storage medium having stored thereon, a set of computer-executable instructions for causing a computer comprising one or more processors to perform steps of creating a graph that comprises a plurality of nodes and a plurality of edges. In an embodiment, at least one edge of the plurality of edges connects more than two nodes of the plurality of nodes. In an embodiment, each of the plurality of nodes represents a customer. The one or more processors are configured to determine a similarity matrix representative of a similarity between each of a plurality of customers, represented by the plurality of nodes, based on the graph. The one or more processors are further configured to decompose the similarity matrix into a first matrix and a second matrix. The one or more processors are further configured to determine a third matrix based on the first matrix, the second matrix, and a scaling parameter. In an embodiment, the one or more processors are further configured to receive information pertaining to a set of churner customers from the plurality of customers is received from a user-computing device. In an embodiment, the set of churner customers correspond to the set of churner customers from the plurality of customers, who have left the service during a pre-defined time interval. The one or more processors are further configured to create a fourth matrix based on the set of churner customers. In an embodiment, the fourth matrix comprises of a first value or a second value assigned to the plurality of customers. The one or more processors are further configured to present the set of potential churn customers on the user-computing device based on the third matrix and fourth matrix.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIG. 4 illustrates a sample incidence matrix, in accordance with at least one embodiment;

DETAILED DESCRIPTION

Figure 1:
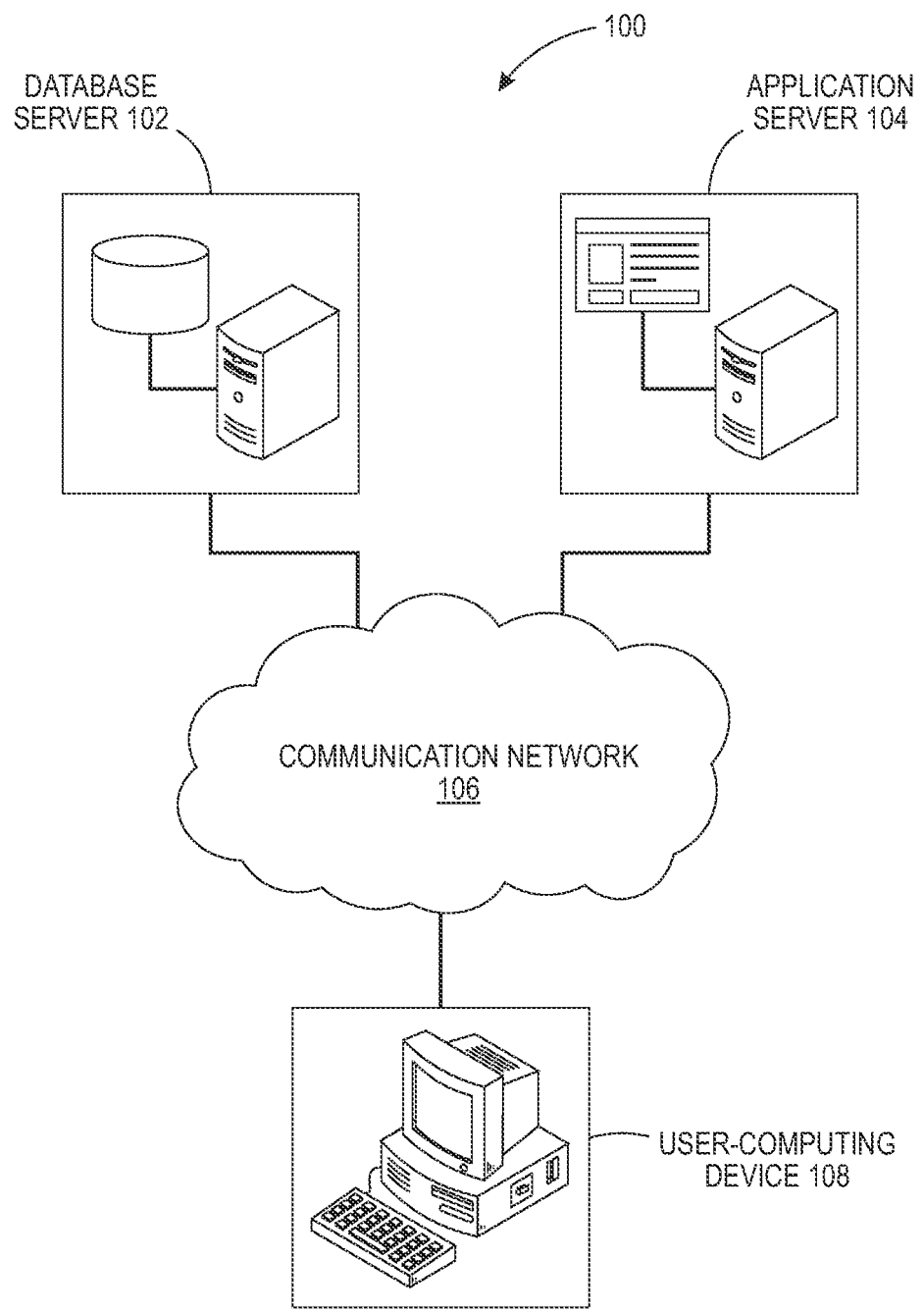
FIG. 1 is a block diagram that illustrates a system environment in which various embodiments of the method and the system may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

A "graph" refers to a representation of a plurality of nodes and a plurality of edges such that at least one edge of the plurality of edges connects more than two nodes of the plurality of nodes. In an embodiment, the plurality of nodes represents a plurality of customers. In an embodiment, the plurality of edges represents a plurality of attributes associated with the plurality of customers. In an embodiment, an edge from the plurality of edges is utilized to relate a set of customers from the plurality of customers with same/similar attributes. An example of the graph includes, but not limited to, a hypergraph.

An "attribute" refers to one or more properties associated with each of the plurality of customers. Examples of the attributes associated with each of the plurality of customers include, but not limited to, a gender, a geography, an age, an annual billing amount, a type of service, and the like. In an embodiment, the attribute associated with each customer may vary based on the type of services for which the customer churn is being predicted. For instance, if the customer churn is being predicted for telecom operators, the one or more attributes may include an annual billing amount, a voice usage, a data usage, and the like. In another example, if the customer churn is being predicted for banking services, the one or more attributes may include a number of years of association with a bank, an account type, a credit limit, an annual spent amount, and the like.

An "incidence matrix" refers to a data structure that is used to represent a relationship between the plurality of attributes and the plurality of customers. In an embodiment, the incidence matrix may include a plurality of rows and columns. Each row of the incidence matrix represents a customer. Each column of the incidence matrix represents the edge of the plurality of edges. As discussed, each edge represents an attribute of each of the plurality of customers. In an embodiment, the edge in the incidence matrix is represented as an n-dimensional vector with binary entries. For example, in a graph with n nodes and m edges, let $\pi=[e_1 \ldots e_2 \ldots e_m]$ be the n×m dimensional incidence matrix of the graph. Each edge of the graph $e_i=[e_{1,i}, \ldots e_{j,i}, \ldots e_{n,i}]$ is a n dimensional vector with binary entries, where $e_{j,i}=1$ suggests that j-th node possesses the attribute represented by the edge i. Thus, each edge links multiple nodes with varying value of j for which $e_{j,i}=1$. Therefore, the graph created based on the incidence matrix captures multiple relations between the plurality of customers.

A "churned customer" refers to a customer from the plurality of customers who has left a first service provider and has availed the service of a second service provider. For example, the service provided by the service provider includes, but not limited to, a voice service, a data service, an online banking service, a telephone banking service, and the like.

A "non-churner customer" refers to a customer from the plurality of customers who has not left the first service provider.

A "potential churner customer" refers to a customer from the plurality of customers who has a high likelihood to leave the first service provider and avail the services of the second service provider.

A "similarity matrix" refers to a data structure that represents a degree of connectivity between each of the plurality of customers. The degree of connectivity represents a number of similar attributes among the plurality of customers. In an embodiment, the similarity matrix is also annotated as a graph laplacian. The similarity matrix is determined based on a diagonal node degree matrix, a diagonal edge degree matrix, and a diagonal edge weight matrix. The diagonal node degree matrix represents a degree of each node. The degree, associated with each node, indicates a number of edges associated with a node. The diagonal edge degree matrix represents a number of customers in each edge. The diagonal edge weight matrix represents a weight associated with each of the plurality of edges. The weight associated with each of the plurality of edges indicates a relative significance or a measure of similarity of the one or more attributes over the remaining attributes. For example, if the weight assigned to an edge e1 is 0.8 and the weight assigned to an edge e2 is 0.2, then the assigned weights signify that the attribute represented by the edge e1 is of more significance as compared to the attribute represented by the edge e2.

A "heat kernel matrix" refers to a data structure that may define an effect of a customer on each of the other customers in the plurality of customers. The heat kernel matrix is represented by H(t). For example, if a "customer A" churns out from the first service provider to the second service provider, then the heat kernel matrix is utilized to determine the set of potential churn customers that may be influenced by the "customer A" and accordingly may churn in near future.

A "scaling parameter" represents a factor that defines a radius of neighborhood to determine a customer's influence propagated among the plurality of customers. The scaling factor governs a scale of the customer's influence propagated among the plurality of customers based on a value assigned to the scaling parameter. The value of the scaling parameter varies from zero to infinity. In an embodiment, a small-scale diffusion is performed when the value of the scaling parameter is set substantially equal to zero. In an embodiment, a large-scale diffusion is performed when the value of the scaling parameter is set substantially equal to infinity. For example, in order to predict churn customers at a department level, the value of the assigned to the scaling parameter is substantially equal to zero. Similarly, in order to predict churn customers at an organization level, the value of the assigned to the scaling parameter is substantially equal to infinity.

A method for customer churn prediction based on graph modelling is described. The method predicts customer churn associated with a service of an organization. The method creates the graph that comprises of the plurality of nodes and the plurality of edges. In an embodiment, at least one edge of the plurality of edges in the graph connects more than two nodes of the plurality of nodes. In an embodiment, each of the plurality of nodes in the graph represents a customer. In an embodiment, the plurality of edges represents a plurality of attributes associated with the plurality of customers. The method further determines a similarity matrix representative of the similarity between each of a plurality of customers, represented by the plurality of nodes, based on the graph. The method decomposes the similarity matrix into the first matrix and the second matrix. The method further determines the third matrix based on the first matrix, the second matrix, and the scaling parameter. In an embodiment, the scaling parameter defines a neighborhood around the customer for which a customer influence value is determined.

In an embodiment, information pertaining to a set of churner customers from the plurality of customers is received from the user-computing device. In an embodiment, the set of churner customers correspond to the set of customers who have stopped using the services of the organization during a pre-defined time interval. In an embodiment, the pre-defined time interval may vary from 1 day to 1 month. In an embodiment, the set of customers during the pre-defined time interval may refer to the set of customers churned in real-time. The method further creates a fourth matrix based on the set of churner customers during the pre-defined time. In an embodiment, the fourth matrix comprises a first value or a second value assigned to the plurality of customers. The first value is assigned to a set of non-churner customers from the plurality of customers. The second value is assigned to a set of churner customers from the plurality of customers. In an embodiment, a third value is assigned to the customers from which the set of potential churner customers is to be determined. Based on the third matrix and the fourth matrix, the method further presents a set of potential churner customers on a user-computing device. The method further determines a customer influence value associated with each customer in the plurality of customers based on the third matrix and the fourth matrix. The method further compares the customer influence value associated with each customer in the plurality of customers with a pre-defined threshold to identify the set of potential churn customers from the plurality of customers. In an embodiment, an updated fourth matrix is received in real-time from the user-computing device. The method further updates in real-time the set of potential churn customers on the user-computing device based on the updated fourth matrix.

The method further comprises assigning, by the one or more processors, a weight to an edge, from the plurality of edges. The weight associated with each of the plurality of edges indicates a relative significance of the one or more attributes over the remaining attributes. In an embodiment, the weight assigned to the edge is less in comparison to a weight assigned to remaining edges in the plurality of edges, if a number of nodes encompassed by the edge are greater than a pre-defined threshold. The graph is created based on the incidence matrix. Each edge of the plurality of edges in the incidence matrix is represented as an n-dimensional vector with binary entries.

FIG. 1 is a block diagram that illustrates a system environment 100 in which various embodiments of the method and the system may be implemented. The system environment 100 includes a database server 102, an application server 104, a communication network 106, and a user-computing device 108. The database server 102, the application server 104, and the user-computing device 108 are communicatively coupled to each other via the communication network 106. In an embodiment, the application server 104 communicates with the database server 102 using one or more protocols such as, but not limited to, Open Database Connectivity (ODBC) protocol and Java Database Connectivity (JDBC) protocol. In an embodiment, the user-computing device 108 communicates with the application server 104, via the communication network 106.

In an embodiment, the database server 102 is configured to store data associated with the plurality of customers. In an embodiment, the database server 102 may obtain the data associated with the plurality of customers from a plurality of structured data sources, a plurality of semi-structured data sources, and a plurality of unstructured data sources. In an embodiment, the data may correspond to various data types such as, but not limited to, a text, an image, and a video. In an embodiment, the data may include customer information, such as, but not limited to, a customer name, contact details, a residential address, and one or more attributes associated a customer. In an embodiment, the one or more attributes may include, but not limited to, a customer age, a service type, an industry type, annual billing amount, a download usage, an upload usage and the like. In an embodiment, the database server 102 is configured to store the data associated with the plurality of customers in a structured manner. The database server 102 is configured to utilize one or more semantic based data fusion techniques to store the data in a structured manner. In an embodiment, the data is stored in a structured manner using one or more indexing techniques. In an embodiment, the database server 102 is configured to implement one or more graph analytics techniques and predictive machine learning techniques on the stored data. In an embodiment, the database server 102 is configured to execute one or more semantic queries to enable implementation of machine-learning techniques over a graph-based representation of the stored data. In an embodiment, the database server 102 is configured to receive one or more queries from the application server 104 to extract the data associated with the plurality of customers. The database server 102 is realized through various technologies such as, but not limited to, Microsoft® SQL Server, Oracle®, IBM DB2®, Microsoft Access®, PostgreSQL®, MySQL® and SQLite®, and the like.

A person with ordinary skills in the art would understand that the scope of the disclosure is not limited to the database server 102 as a separate entity. In an embodiment, the functionalities of the database server 102 can be integrated into the application server 104.

In an embodiment, the application server 104 refers to a computing device or a software framework hosting an application or a software service. In an embodiment, the application server 104 is implemented to execute procedures such as, but not limited to, programs, routines, or scripts stored in one or more memories for supporting the hosted application or the software service. In an embodiment, the hosted application or the software service is configured to perform one or more predetermined operations. The application server 104 is realized through various types of application servers such as, but not limited to, a Java application server, a .NET framework application server, a Base4 application server, a PHP framework application server, or any other application server framework.

In an embodiment, the application server 104 is configured to create a graph that comprises the plurality of nodes and the plurality of edges. The application server 104 is further configured to determine the similarity matrix representative of a similarity between each of the plurality of customers, represented by the plurality of nodes, based on the created graph. The application server 104 is configured to decompose the similarity matrix into a first matrix and a second matrix based on an Eigen decomposition technique. The application server 104 is configured to determine a third matrix, which represents the heat diffusion matrix based on the first matrix, the second matrix, and a scaling parameter. Based on the third matrix, the application server 104 identifies a set of potential churn customers from the plurality of customers. The application server 104 is further configured to present the set of potential churn customers on the user-computing device 108.

A person having ordinary skill in the art would appreciate that the scope of the disclosure is not limited to realizing the application server 104 and the user-computing device 108 as separate entities. In an embodiment, the application server 104 may be realized as an application program installed on and/or running on the user-computing device 108 without departing from the scope of the disclosure.

In an embodiment, the communication network 106 corresponds to a communication medium through which the database server 102, the application server 104, and the user-computing device 108 communicate with each other. Such a communication is performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 includes, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the user-computing device 108 refers to a computing device used by a user. The user-computing device 108 comprises of one or more processors and one or more memories. The one or more memories may include computer readable code that is executable by the one or more processors to perform predetermined operations. In an embodiment, the user-computing device 108 may present a user-interface to the user to display the set of potential churn customers. In an embodiment, the user-computing device 108 may include hardware and software to present the set of potential churn customers to the user. Example user-interfaces presented on the user-computing device 108 for presenting the set of potential churn customers to the user have been explained in conjunction with FIG. 5A, and FIG. 5B. Examples of the user-computing device 108 include, but are not limited to, a personal computer, a laptop, a personal digital assistant (PDA), a mobile device, a tablet, or any other computing device.

Figure 2:
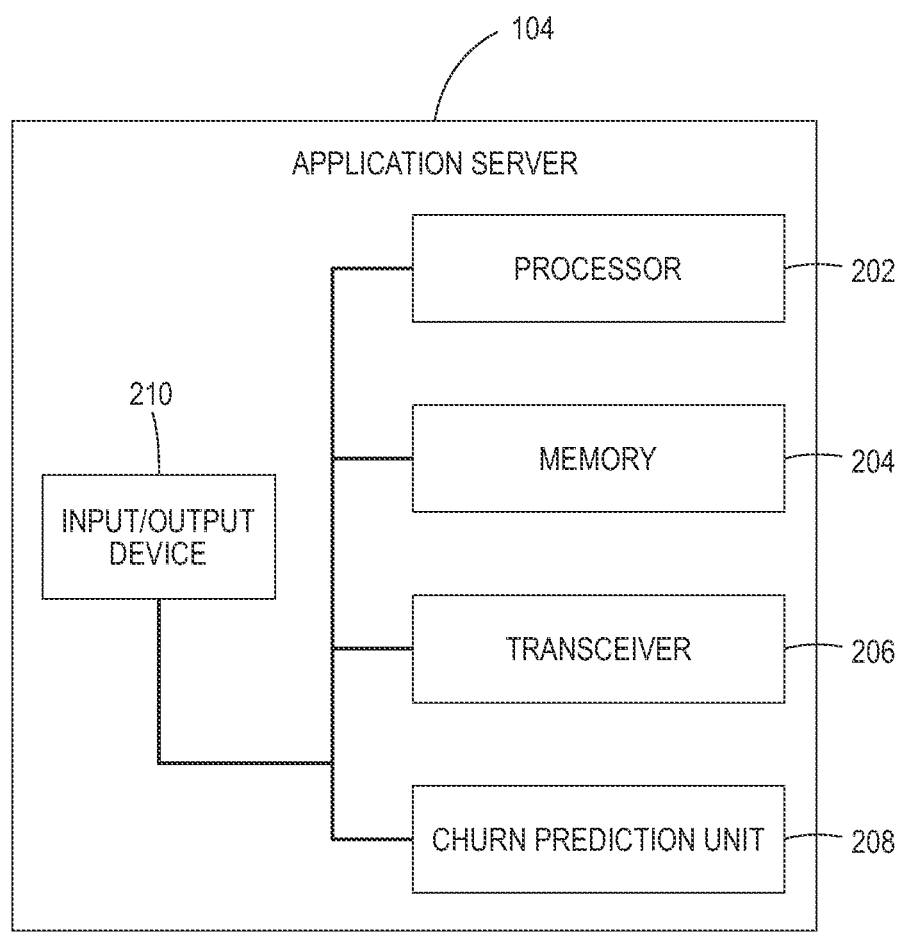
FIG. 2 is a block diagram that illustrates an application server configured to determine a set of potential churn customers, in accordance with at least one embodiment.

FIG. 2 is a block diagram that illustrates the application server 104 configured to determine the set of potential churn customers, in accordance with at least one embodiment. FIG. 2 is explained in conjunction with elements from FIG. 1. In an embodiment, the application server 104 includes a processor 202, a memory 204, a transceiver 206, a churn prediction unit 208, and an input/output device 210. The processor 202 is communicatively connected to the memory 204, the transceiver 206, the churn prediction unit 208, and the input/output device 210. The transceiver 206 is communicatively coupled to the communication network 106.

The processor 202 comprises suitable logic, circuitry, interfaces, and/or code that is configured to execute a set of instructions stored in the memory 204. The processor 202 is implemented based on a number of processor technologies known in the art. The processor 202 works in conjunction with the churn prediction unit 208 to determine the set of potential churn customers. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that is configured to store the set of instructions, which are executed by the processor 202. In an embodiment, the memory 204 is configured to store one or more programs, routines, or scripts that are executed by the processor 202 in conjunction with the churn prediction unit 208. The memory 204 is implemented based on a Random Access Memory (RAM), a Read-Only Memory (ROM), a Hard Disk Drive (HDD), a storage server, and/or a Secure Digital (SD) card.

The transceiver 206 comprises of suitable logic, circuitry, interfaces, and/or code that is configured to receive data associated with the plurality of customers from the database server 102, via the communication network 106. The transceiver 206 is further configured to transmit the set of potential churn customers to the user-computing device 108, via the communication network 106. The transceiver 206 implements one or more known technologies to support wired or wireless communication with the communication network 106. In an embodiment, the transceiver 206 includes, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 communicates via wireless communication with networks, such as the Internet, an Intranet and/or a wireless network, such as a cellular telephone network, a wireless local area network (LAN) and/or a metropolitan area network (MAN). The wireless communication uses any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The churn prediction unit 208 comprises suitable logic, circuitry, interfaces, and/or code that is configured to create the graph that comprises of the plurality of nodes and the plurality of edges based on the incidence matrix. Further, the churn prediction unit 208 may be configured to employ one or more graph processing techniques to perform one or more operations on the graph. In an embodiment, the one or more graph processing techniques may include, but are not limited to, one or more decomposition techniques, such as an Eigen decomposition technique, addition of matrices, subtraction of matrices, multiplication of matrices, determine a transpose of a matrix, determine a square root, and the like.

The input/output device 210 comprises suitable logic, circuitry, interfaces, and/or code that is configured to receive an input or provide an output to a user. The input/output device 210 comprises of various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 receives the structured data, which includes information pertaining to the plurality of customers. In an embodiment, the structured data may further include information related to the plurality of attributes, associated with each of the plurality of customers. As discussed, the plurality of attributes may include, but not limited to a gender, a geography, an age, an annual billing amount, a type of service, a number of complaints, an industry type and the like. However, the scope of the disclosure is not limited to aforementioned attributes. A person having ordinary skill in the art would understand that the attribute list may vary based on the field for which the customer churn is being predicted. For example, the customer churn may be predicted in a banking service industry, an information technology industry, a healthcare industry, and the like.

Based on the plurality of attributes received from the database server 102, the processor 202 is configured to define one or more bins such that each bin defines one unique edge in the graph. In an embodiment, the processor 202 creates a bin for each attribute. In certain scenarios, an attribute, from the plurality of attributes, may contain continuous numerical values. In such a scenario, in an embodiment, the processor 202 is configured to perform one or more operations, such as discretization on the attribute. The discretization may involve defining one or more bins using a density plot of numerical values of an attribute. The detailed process of creating one or more bins is explained later in conjunction with FIG. 3. However, the scope of the disclosure is not limited to the process of deriving edges by binning the plurality of attributes. A person having ordinary skill in the art would understand that other techniques may be utilized to derive the edges.

The churn prediction unit 208 is configured to generate the incidence matrix based on the created bins, representing the plurality of attributes. The incidence matrix is a matrix with a plurality of rows and a plurality of columns. Each row of the incidence matrix represents a customer. Each column of the incidence matrix represents a bin (which in turn represents an edge). For example, let the number of customers be four and the number of attributes or bins associated with the customers be five. The churn prediction unit 208 creates a 4×5 dimensional incidence matrix. The churn prediction unit 208 may populate the incidence matrix with binary value "1" or "0". If a customer exhibits an attribute represented by a column in the incidence matrix, the churn prediction unit 208 may insert the binary value "1" in a cell of the incidence matrix that represents attribute and the customer. Similarly, the churn prediction unit 208 may populate the incidence matrix with binary values.

Following is an example populated incidence matrix:

$$\text{Incidence matrix} = \begin{bmatrix} 1 & 1 & 0 & 1 & 1 \\ 1 & 1 & 1 & 1 & 0 \\ 0 & 1 & 1 & 1 & 0 \\ 0 & 0 & 0 & 0 & 1 \end{bmatrix} \quad (A)$$

From the incidence matrix, it can be observed that customer c1 and c2 have attribute a1. Further, it can be observed that the customer c1, customer c2, and customer c3 exhibit attribute a2. Similarly, customer c2, and customer c3 exhibit attribute a3. Similarly, customer c1, customer c2, and customer c3 exhibit attribute a4. Further, customer c1, and customer c4 exhibit attribute a5.

Based on the incidence matrix, the churn prediction unit 208 is configured to create the graph. The creation of the graph is based on the incidence matrix that has been described in detail in conjunction with FIG. 4, and FIG. 5. The graph represents the customers by nodes and attributes by edges. The graph captures multiple relations between the plurality of customers based on the incidence graph. For example, the edge $e_1$ of the graph captures the relation that the customer c1 and customer c2 are of the same age range. Similarly, the edge e2 of the graph captures the relation that customer that c1, customer c2, and customer c3 have opted for voice service type. Similarly, the edge e3 of the graph captures the relation that customer c2 and customer c3 have opted for data service type. Similarly, the edge e4 of the graph captures the relation that customer c1, customer c2, and customer c3 have opted for the caller tune service. Similarly, the edge e5 of the graph captures the relation that customer c1 and customer c4 have opted for the missed call notification service.

In an embodiment, the churn prediction unit 208 may assign weight to each of the plurality of edges. The weight associated with each of the plurality of edges indicates a relative significance of an attribute over the remaining attributes. In an embodiment, the weight assigned to the edge is less in comparison to a weight assigned to remaining edges in the plurality of edges, if a number of nodes encompassed by the edge is greater than a pre-defined threshold. For example, if the edge e1 encompasses 10 nodes and the edge e2 encompasses 3 nodes, and let the pre-defined threshold be 5, then the weight assigned to the edge e1 is 0.2, and the weight assigned to the edge e2 is 0.8. As each edge represents an attribute, if the weight assigned to an attribute is less than the weight assigned to another attribute, then the attribute that is assigned less weight does not contribute to the churning of the customer.

Based on the assigned weights, a diagonal edge weight matrix is defined by the churn prediction unit 208. The diagonal edge weight matrix denoted by $W_e$ is an m×m diagonal edge weight matrix and is defined as diag ($[w_1, \ldots, w_2, \ldots, w_m]$) where $w_1, w_2, \ldots w_m$ represent the weight associated with each of the plurality of edges.

Based on the created graph utilizing the incidence matrix, the churn prediction unit 208 is further configured to determine a diagonal node degree matrix and a diagonal edge degree matrix. The diagonal node degree matrix represents a degree of each node. The degree, associated with each node, indicates a number of edges associated with each of the plurality of nodes. For example, from the incidence matrix (refer equation A), it can be observed that the customer c1 is associated with four attributes (represented by edges in the graph). Therefore, the degree associated with the customer c1 is four. The diagonal node degree matrix denoted by $D_v$ is an n×n diagonal node degree matrix and is defined as diag ($\Sigma\pi$), where $\pi$ is the incidence matrix.

The diagonal edge degree matrix represents a number of customers encompassed by each edge. The diagonal edge degree matrix denoted by $D_e$ is an m×m diagonal edge degree matrix and is defined as diag ($\Sigma\pi^T$). For example, for the incidence matrix denoted by A above, diagonal node degree matrix denoted by $D_v$ is shown as below:

$$\text{diag}\left(\sum \pi\right) = \begin{pmatrix} 4 & 0 & 0 & 0 \\ 0 & 4 & 0 & 0 \\ 0 & 0 & 3 & 0 \\ 0 & 0 & 0 & 1 \end{pmatrix}$$

Further, the diagonal edge degree matrix denoted by $D_e$ is shown as below:

$$\text{diag}\left(\sum (\pi^T)\right) = \begin{pmatrix} 2 & 0 & 0 & 0 & 0 \\ 0 & 3 & 0 & 0 & 0 \\ 0 & 0 & 2 & 0 & 0 \\ 0 & 0 & 0 & 3 & 0 \\ 0 & 0 & 0 & 0 & 2 \end{pmatrix}$$

A person skilled in the art will understand that the scope of the disclosure should not be limited to determining the diagonal node degree matrix and determining the diagonal edge degree matrix based on the aforementioned factors and using the aforementioned techniques. Further, the examples provided in supra are for illustrative purposes and should not be construed to limit the scope of the disclosure.

The churn prediction unit 208 is configured to generate the similarity matrix, indicative of a degree of connectivity between each of the plurality of customers, based on the diagonal node degree matrix, the diagonal edge degree matrix, and the diagonal edge weight matrix. The "similarity matrix" defines a degree of connectivity between each of the plurality of customers. The degree of connectivity represents a number of similar attributes associated with each of the plurality of customers. In an embodiment, the similarity matrix is also annotated as a graph laplacian. The similarity matrix denoted by L is determined in accordance with equation (1).

$$L = I - (D_v^{-1/2} \pi W_e D_e^{-1} \pi^T D_v^{-1/2}) \tag{1}$$

where,

I corresponds to an identity matrix;

$D_v$ is the n×n diagonal node degree matrix and is defined as diag ($\Sigma\pi$);

$\pi$ is the n×m dimensional incidence matrix with m edges and each edge of the plurality edges of the graph represented as $e_i = [e_{1,i}, \ldots e_{j,i}, \ldots e_{n,i}]$ is a n dimensional vector with binary entries where $e_{j,i} = 1$ suggest that j-th node contributes to the edge and zero otherwise. Thus, each edge links multiple nodes with varying value of j for which $e_{j,i} = 1$;

$D_e$ is the m×m diagonal edge degree matrix and is defined as diag ($\Sigma\pi^T$);

$W_e$ is the m×m diagonal edge weight matrix and is defined as diag ($[w_1, \ldots, w_2, \ldots, w_m]$) where $w_1, w_2, \ldots w_m$ represent the weight associated with each of the plurality of edges; and $\pi^T$ represents a transpose of the incidence matrix $\pi$.

A person skilled in the art will understand that the scope of the disclosure should not be limited to determining the similarity matrix based on the aforementioned factors and using the aforementioned techniques. Further, the examples provided in supra are for illustrative purposes and should not be construed to limit the scope of the disclosure.

Further, the churn prediction unit 208 is configured to decompose the similarity matrix L into a first matrix and a second matrix based on one or more known in the art decomposition techniques. In an embodiment, the similarity matrix L is decomposed based on an Eigen decomposition technique. The Eigen decomposition comprises of the first matrix, and the second matrix, which together define the laplacian spectra. The Eigen decomposition of the similarity matrix L is determined in accordance with equation (2).

$$L = U\Lambda U^T \tag{2}$$

where, $U = [u1, \ldots, un]$ is the first matrix formed by a plurality of eigen vectors of the similarity matrix L;

$\Lambda = \text{diag}(\lambda 1, \ldots \lambda n)$ is the second matrix, which represents a diagonal eigen value matrix; and $U^T$ represents a transpose of the first matrix U.

A person skilled in the art will understand that the scope of the disclosure should not be limited to determining the Eigen decomposition based on the aforementioned factors and using the aforementioned techniques. Further, the examples provided in supra are for illustrative purposes and should not be construed to limit the scope of the disclosure.

The churn prediction unit 208 is further configured to determine the third matrix, which alternatively is annotated as the heat kernel matrix and denoted by H(t), associated with the laplacian spectra, based on the first matrix, the second matrix and the scaling parameter t. The churn prediction unit 208 determines the third matrix, also annotated as the heat kernel matrix, in accordance with equation (3).

$$H(t)=U\exp(-\Lambda t)U^T \qquad (3)$$

The scaling parameter t corresponds to a factor that defines a radius of neighborhood to determine a customer's influence propagated among the plurality of customers. In an embodiment, an administrator of the application server 104 predefines the scaling parameter t. In an embodiment, the value of the scaling parameter t varies from zero to infinity. A small-scale heat diffusion is performed, when the value scaling parameter t is set substantially equal to zero, to identify the set of potential churn customers in a small neighborhood. Similarly, a large-scale heat diffusion is performed, when the value scaling parameter t is set substantially equal to infinity, to identify the set of potential churn customers in a large neighborhood.

Based on the determined heat kernel matrix, the churn prediction unit 208 is configured to determine a set of potential churn customers from the plurality of customers. The churn prediction unit 208 is configured to present the set of potential churn customers from the plurality of customers on the user-computing device 108.

A person skilled in the art will understand that the scope of the disclosure should not be limited to determining the heat kernel matrix based on the aforementioned factors and using the aforementioned techniques. Further, the examples provided in supra are for illustrative purposes and should not be construed to limit the scope of the disclosure.

Thus, the third matrix, also annotated as the heat kernel matrix is used to determine the influence of the customer on the plurality of customers. Based on the third matrix, the processor 202 is configured to implement one or more application specific operations. In an implementation scenario, the third matrix is used to determine churn prediction of customers associated with a service of an organization. A person skilled in the art will understand that the scope of the disclosure should not be limited to utilizing the third matrix to determine only churn prediction of customers.

In order to predict the set of potential churn customers, the churn prediction unit 208 is further configured to receive information pertaining to a set of churner customers that are no longer using the services of the organization. In an embodiment, the set of churner customers correspond to the set of customers who have stopped using the services during the pre-defined time interval. In an embodiment, the pre-defined time interval may vary from 1 day to 1 month. In an embodiment, the set of customers during the pre-defined time interval may refer to the set of customers churned in real-time.

Based on the information of the set of churner customers, the churn prediction unit 208 is configured to create the fourth matrix. The fourth matrix represents the plurality of customers. The plurality of customers include a set of non-churner customers, a set of churner customer, and a set of as testing nodes for which churn prediction is to be determined by the churn prediction unit 208. In an embodiment, the set of churner customers is updated based on the information after the pre-defined time interval. For example, if the pre-defined time interval is set to 1 day, then the based on the information of customers who have churned in the past 1 day, the churn prediction unit 208 is configured to update the fourth matrix. In another exemplary scenario, if the pre-defined time interval is set to real-time, then as soon as a customer churns out, then the churn prediction unit 208 updates the fourth matrix. The fourth matrix (Y) is represented in accordance with equation (4).

$$Y=\{y_1, \ldots, y_n\} \qquad (4)$$

In order to distinguish between the set of non-churner customers, the set of churner customer, and the set of customers for which the churn prediction is to be determined, the churn prediction unit 208 is configured to assign a first value, and a second value associated with the plurality of customers. In an embodiment, the first value is assigned to a set of non-churner customers in the plurality of customers. Further, in an embodiment, the churn prediction unit 208 is further configured to assign the second value to a set of churner customers in the plurality of customers. In a binary class classification, the first value assigned to the set of non-churner customers is "−1" and the second value assigned to the set of churner customers is "1". The testing nodes are assigned a value of "0". For example, let us consider that $Y=\{y_1, \ldots, y_n\}$ is the fourth matrix for five customers, such as a customer c1, a customer c2, a customer c3, a customer c4, and a customer c5. Out of the five customers, the customer c1 and the customer c3 are non-churner customers. Further, the customer c2, the customer c4, and the customer c5 are churner customers. Therefore, churn prediction model will formulate the Y matrix as {−1, 1, −1, 1, 1}. In an alternate embodiment, in a multi-class classification system, the fourth matrix (Y) is defined as an n×c matrix for a c class classification problem.

The churn prediction unit 208 is configured to determine the customer influence value associated with each customer in the plurality of customers based on the heat kernel matrix and the fourth matrix. The customer influence value is a value indicative of a degree of influence of each of the plurality of customers on a customer. Thus, for each testing node, the churn prediction unit 208 is configured to determine the degree of influence of the set of churner customers and the set of non-churner customers. The churn prediction unit 208 determines customer influence value in accordance with equation (5).

$$Y_t = H(t)Y \qquad (5)$$

The churn prediction unit 208 is further configured to compare the determined customer influence value associated with each of the plurality of customers with a pre-defined threshold to identify the set of potential churn customers from the plurality of customers. Thus, in an embodiment, if the customer influence value associated with a customer is greater than a pre-defined threshold, then the customer is included in the set of potential churn customers. In an exemplary scenario, if the customer influence value associated with a customer P is less than the pre-defined threshold, then the customer P is included in the set of potential churn customers. In an embodiment, the customer influence value associated with a customer may be updated after the pre-defined time interval based on the information of the set of churner customers. In an embodiment, if the pre-defined time interval is set to real-time, then the customer influence value is updated as soon as a customer churns out.

In an embodiment, the churn prediction unit 208 is further configured to receive in real-time an updated fourth matrix from a user-computing device. Further, the churn prediction unit 208 is configured to determine an updated customer influence value associated with each customer based on the updated fourth matrix. In an embodiment, the updated customer influence value may be determined after the pre-defined time interval. In an embodiment, the churn prediction unit 208 is further configured to update in real-time the set of potential churn customers based on the updated customer influence value. In an alternate embodiment, the heat kernel matrix is updated after the pre-defined time interval based on the set of potential churn customers. In an exemplary scenario, the set of churner customers may be updated based on the set of potential churner customers. In an embodiment, the churn prediction unit 208 is further configured to update the customer influence value for each customer after the pre-defined time interval based on the set of potential churner customers.

In an alternate embodiment, in the multi-class classification system, the set of potential churn customers from the plurality of customers is identified by selecting the set of customers with a maximum value assigned by the churn prediction unit 208. The churn prediction unit 208 is configured to present the set of potential churn customers on the user-computing device 108.

A person skilled in the art will understand that the scope of the disclosure should not be limited to determining the customer influence value based on the aforementioned factors and using the aforementioned techniques. Further, the examples provided in supra are for illustrative purposes and should not be construed to limit the scope of the disclosure.

Figure 3:
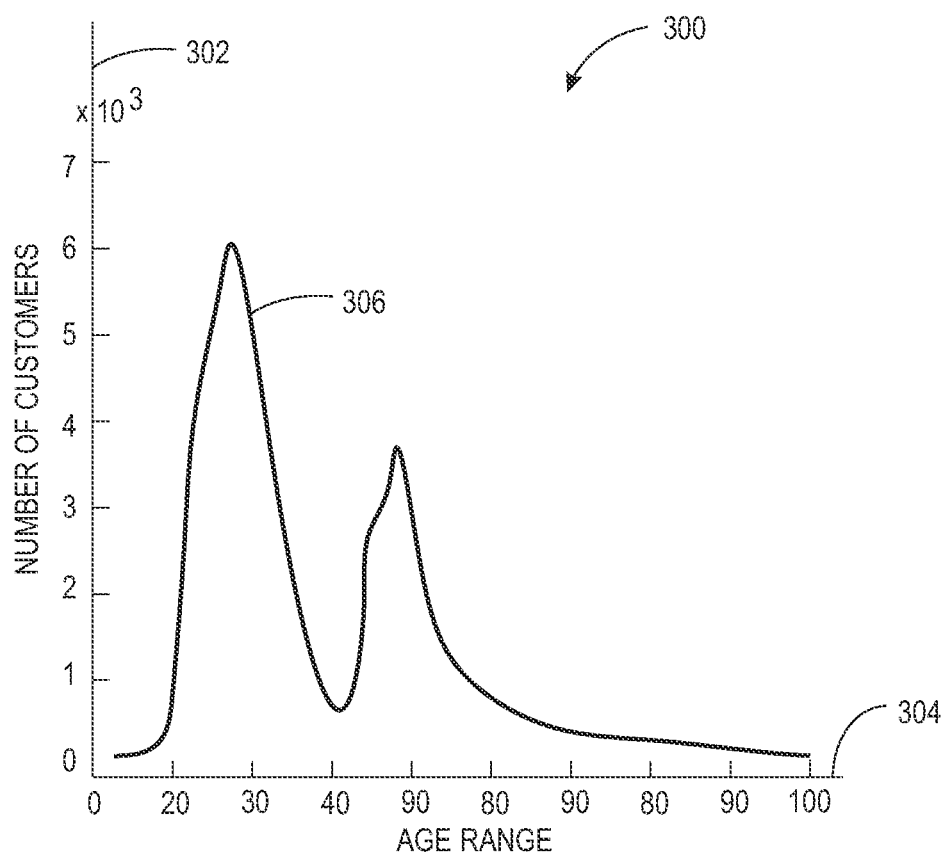
FIG. 3 illustrates a density plot of an attribute, in accordance with at least one embodiment.

FIG. 3 illustrates a density plot 300 of an attribute, in accordance with at least one embodiment. FIG. 3 is explained in conjunction with elements from FIG. 1 and FIG. 2.

In an embodiment, the processor 202 generates a histogram, indicative of the density plot 300, associated with an attribute based on the data received from the database server 102. In an embodiment, if the plurality of attributes, associated with each of the plurality of customers, are continuous numerical values, then the processor 202 is configured to perform one or more operations, such as discretization on the plurality of attributes. Further, the processor 202 is configured to perform binning on the density plot 300. Initially, the processor 202 defines boundaries of the one or more bins such that equal number of customers are included in each bin from the one or more bins. In an embodiment, the processor 202 performs binning such that more number bins are defined in an area of high density as compared to the number of bins defined in an area of low density. Based on the binning, the processor 202 is configured to determine a number of edges represented by the attribute.

As shown in FIG. 3, the density plot 300 include a first axis 302 and a second axis 304. The first axis 302 represents an age range associated with each customer. Further, the age range may correspond to the attribute associated with each customer of the plurality of customers. The second axis 304 represents a number of customers associated with the age range attribute. Further, the density plot 300 includes a curve 306. The curve 306 represents a relationship between the number of customers and the age range. The curve 306 comprises of one or more peaks and valleys. Based on the one or more peaks and valleys, the processor 202 determines that continuous numerical values are present for the age range attribute in the curve 306.

In order to derive edges associated with the age range attribute, the processor 202 performs binning on the density plot 300. The processor 202 defines boundaries within which the binning is to be performed based on the one or more peaks and valleys. As shown in the FIG. 3, peaks can be identified within the 20-30 age range and 40-50 age range to define the boundaries. Thus, the 20-30 age range and the 40-50 age range are the defined boundaries within which binning is to be performed by the processor 202. Based on the defined boundaries, one or more bins are defined within the boundaries such that equal number of customers are included in each bin from the one or more bins.

In an embodiment, based on the density plot 300 as shown in FIG. 3, the processor 202 defines more number of bins in the area of high density, such as between the 20-30 age range and the 40-50 age range as compared to the number of bins defined in the area of low density, such as between 60 to 100. Based on the defined one or more bins, the processor 202 is configured to determine a number of edges represented by the attribute "age range". For example, between the high-density region, such as between the 20-30 age range, the processor 202 defines nine bins such that equal number of customers are present in each bin, where each bin represents an edge. Similarly, for the high-density region, such as between the 40-50 age range, the processor 202 defines six bins such that equal number of customers are present in each bin, where each bin represents an edge. Thus, for the attribute "age range" the processor 202 defines nine edges and six edges with 20-30 age range and 40-50 age range, respectively.

A person skilled in the art will understand that the scope of the disclosure should not be limited to determining the edges associated with an attribute based on the aforementioned factors and using the aforementioned techniques. Further, the examples provided in supra are for illustrative purposes and should not be construed to limit the scope of the disclosure.

FIG. 4 illustrates a sample incidence matrix 400, in accordance with at least one embodiment. FIG. 4 is explained in conjunction with elements from FIG. 1 and FIG. 2. FIG. 4 illustrates the sample incidence matrix 400 that is utilized to create the graph as illustrated in FIG. 5.

The sample incidence matrix 400 is an 8×4 matrix such that each row of the incidence matrix represents a customer and each column represents an attribute associated with the customers. As shown in the FIG. 4, the plurality of customers is represented by V1, V2, V3, V4, V5, V6, V7, and V8. Each column of the incidence matrix represents the attribute associated with each of the plurality of customers. As shown in the FIG. 4, the plurality of attributes is represented by E1, E2, E3, and E4. For example, the edge E1 represents customers with the attribute of age 20-30. Similarly, the edge E2 represents customers with the attribute of age 30-40. Similarly, the edge E3 represents customers who have opted for a voice service type from a service provider. Similarly, the edge E4 represents customers who have opted for a data service type from a service provider. In an embodiment, each edge of the plurality of edges in the incidence matrix is represented as an n-dimensional vector with binary entries. Each edge of the graph $ei=[e1,i, \ldots ej,i, \ldots en,i]$ is a n dimensional vector with binary entries where $ej,I=1$ suggests that j-th node contributes to the edge and zero otherwise. For example, the edge E1 is represented as [1,1,0,0,0,0,0,0], the edge E2 is represented as [0,1,1,1,1,0, 0,1], the edge E3 is represented as [0,0,0,1,1,1,0,0], and the edge E4 is represented as [0,0,0,0,1,1,1,1]. Thus, each edge links plurality of customers with varying value of j for which $ej,i=1$.

Figure 5:
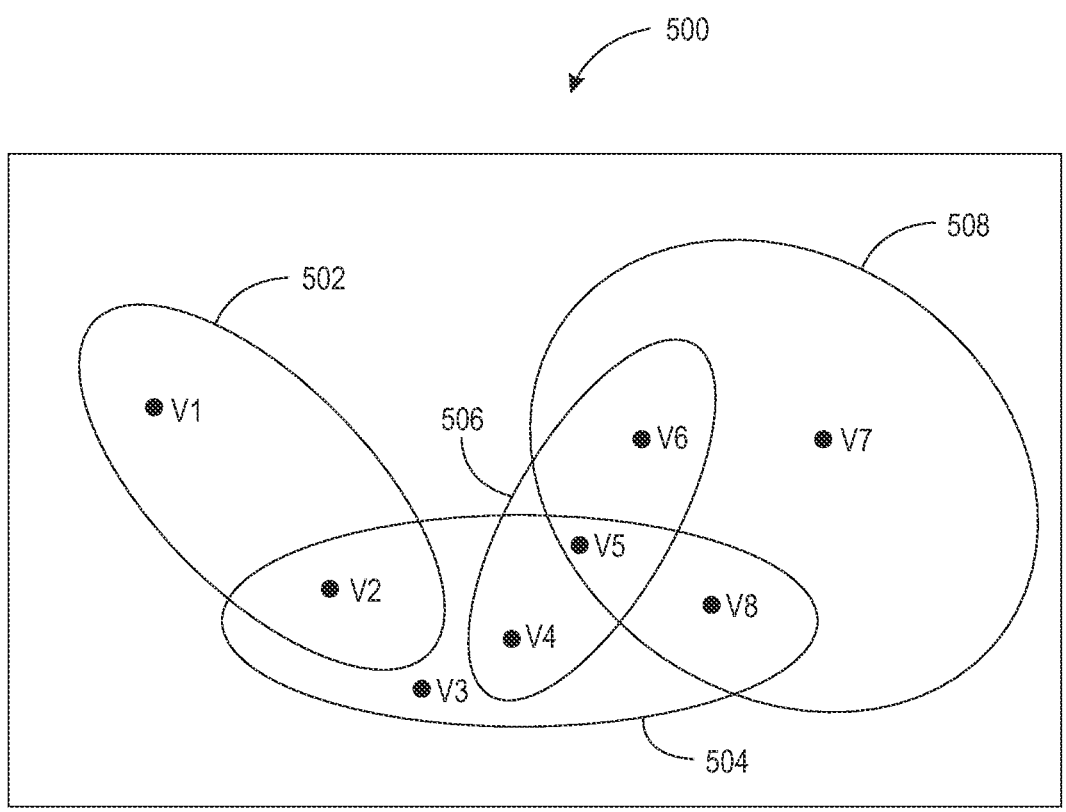
FIG. 5 illustrates a sample graph created based on the sample incidence matrix in accordance with at least one embodiment.

FIG. 5 illustrates a sample graph 500 created based on the sample incidence matrix 400 in accordance with at least one embodiment. FIG. 5 is explained in conjunction with elements from FIG. 1 and FIG. 2. As shown in the graph depicted by FIG. 5, the representation of the edge E1 502 denotes that the customer v1, and the customer v2, are within the age range of 20-30. Similarly, the representation of the edge E2 504 denotes that the customer v2, the customer v3, the customer v4, the customer v5, and the customer v8, are within the age range of 30-40. Similarly, the representation of the edge E3 506 denotes that the customer v4, the customer v5, and the customer v6, have opted for the voice service type from the service provider. Similarly, the representation of the edge E4 508 denotes that the customer v5, the customer v6, the customer v7, and customer v8, have opted for the data service type from the service provider.

A person skilled in the art will understand that the example of the plurality of customers represented by V1, V2, V3, V4, V5, V6, V7, and V8 and the plurality of edges represented by E1, E2, E3, and E4 which indicate the attribute associated with each of the plurality of consumers has been provided for illustrative purposes and should not be construed to limit the scope of the disclosure.

Figure 6:
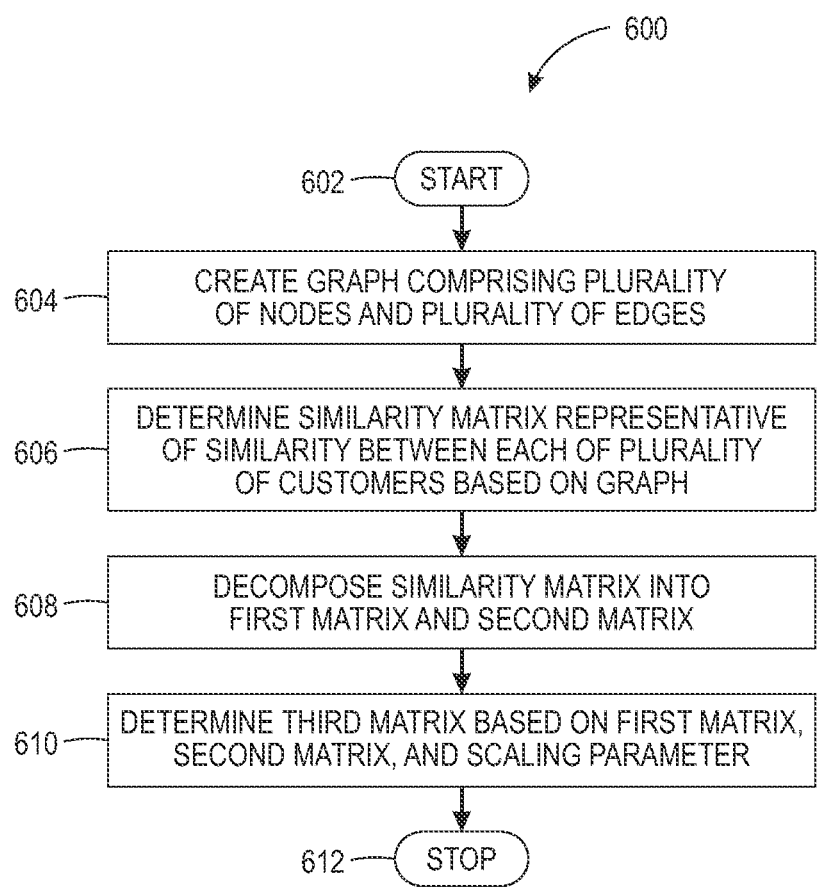
FIG. 6 illustrates a flowchart to determine an influence of a customer on the plurality of customers, in accordance with at least one embodiment.

FIG. 6 illustrates a flowchart 600 to determine an influence of a customer on the plurality of customers, in accordance with at least one embodiment. The flowchart 600 is described in conjunction with FIG. 1 and FIG. 2. The method starts at step 602. At step 604, the churn prediction unit 208 in conjunction with the processor 202 creates the graph that comprises the plurality of nodes and the plurality of edges. The churn prediction unit 208 creates the graph such that at least one edge of the plurality of edges connects more than two nodes of the plurality of nodes. At step 606, the churn prediction unit 208 in conjunction with the processor 202 determines the similarity matrix representative of the similarity between each of the plurality of customers based on the created graph. At step 608, the churn prediction unit 208 in conjunction with the processor 202 decomposes the similarity matrix into the first matrix and the second matrix. At step 610, the churn prediction unit 208 in conjunction with the processor 202 determines the third matrix based on the first matrix, the second matrix, and the scaling parameter. Control passes to end step 612. The third matrix determined by the churn prediction unit 208 indicates the influence of a customer on the plurality of customers. In an embodiment, the third matrix is utilized by the processor 202 to implement one or more application specific operations.

Figure 7:
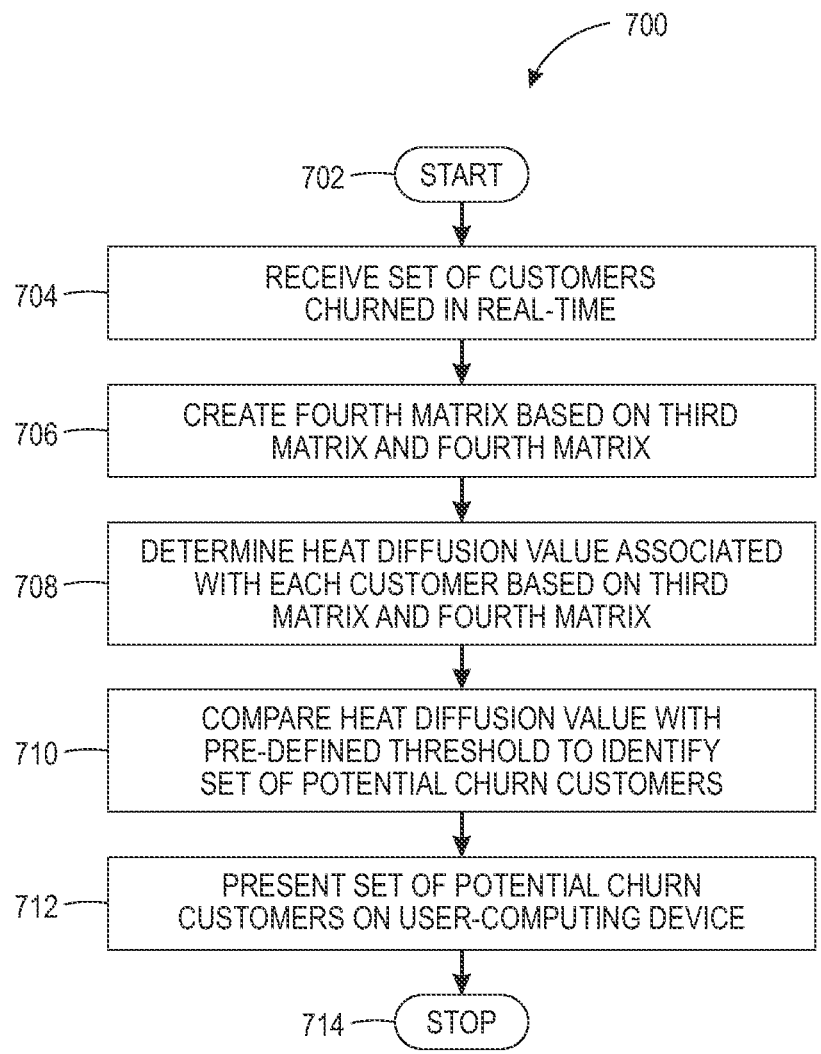
FIG. 7 illustrates a flowchart to determine a set of potential churn customers based on information pertaining to a set of customers who have left the service within a pre-defined time interval, in accordance with at least one embodiment.

FIG. 7 illustrates a flowchart 700 to determine a set of potential churn customers based on information pertaining to a set of customers who have left the service within a pre-defined time interval, in accordance with at least one embodiment. The flowchart 700 is described in conjunction with FIG. 1 and FIG. 2. The method starts at step 702. At step 704, the churn prediction unit 208 is configured to receive the set of churner customers. In an embodiment, the churn prediction unit 208 is configured to receive the set of churner customers from a user-computing device 108. In an embodiment, the set of churned customers correspond to the customers who have left the service for the predefined time interval. At step 706, the churn prediction unit 208 is configured to create the fourth matrix comprising of the first value or the second value assigned to the plurality of customers based on the set of churner customers. The first value represents the set of non-churner customers of the plurality of customers. The second value represents the set of churner customers of the plurality of customers. At step 708, the churn prediction unit 208 in conjunction with the processor 202 determines the customer influence value associated with each customer in the plurality of customers based on the third matrix and the fourth matrix. At step 710, the churn prediction unit 208 in conjunction with the processor 202 compares the customer influence value associated with each customer in the plurality of customers with the pre-defined threshold to identify the set of potential churn customers from the plurality of customers. At step 712, the churn prediction unit 208 in conjunction with the processor 202 presents the set of potential churn customers on the user-computing device 108. Control passes to end step 714.

Figure 8A:
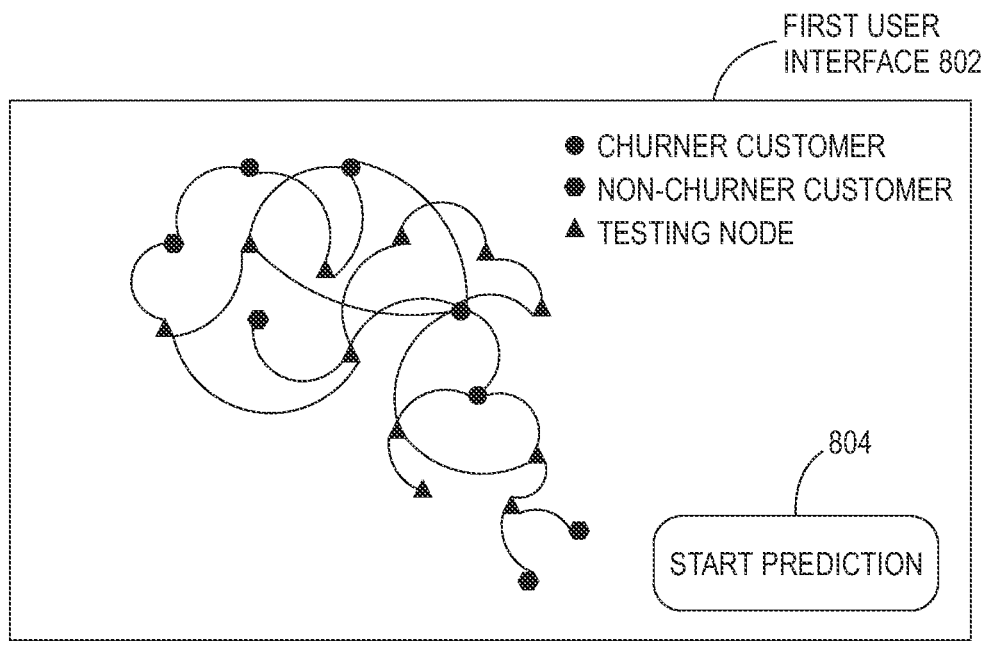
FIGS. 8A and 8B illustrate example user-interfaces presented on a user-computing device to display the set of potential churn customers, in accordance with at least one embodiment.
Figure 8B:
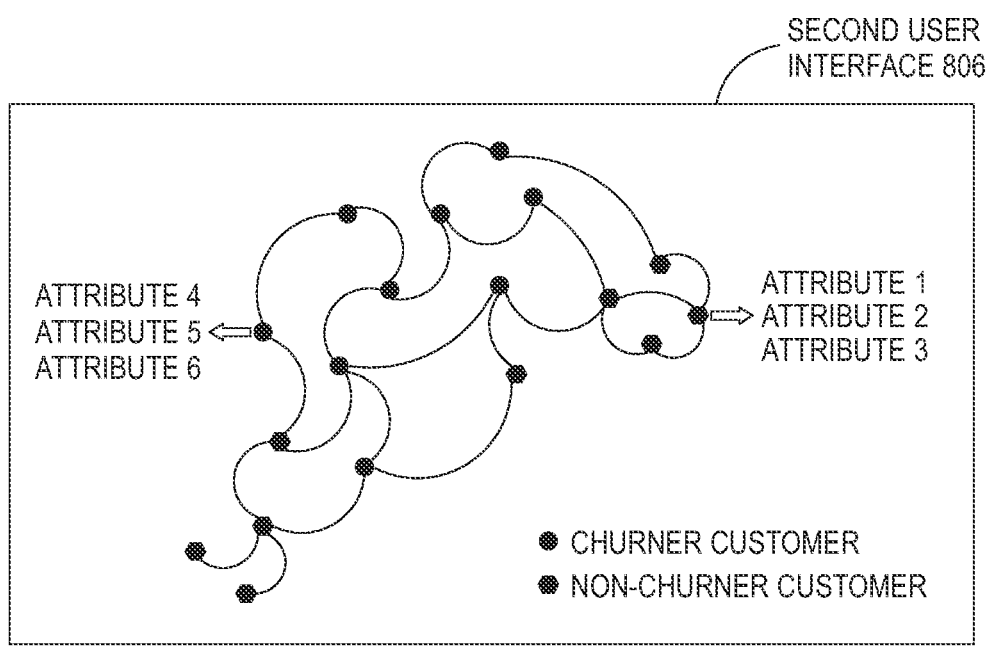

FIGS. 8A, and 8B illustrate example user-interfaces presented on a user-computing device 108 to display the set of potential churn customers, in accordance with at least one embodiment. FIGS. 8A, and 8B are described in conjunction with FIG. 1 and FIG. 2.

FIG. 8A illustrates a first user interface 802 that presents a customer similarity graph that comprises a plurality of training nodes and a plurality of testing nodes. The plurality of training nodes comprise the set of churner customers and the set of non-churner customers. Additionally, the first user interface 802 shows a command button 804 with a label "Start Prediction". The command button 804 is configured such that the command button 804 includes a machine code and/or a computer program having at least one code section executable by a machine and/or a computer. In response to the execution of the machine code by a machine and/or a computer, the churn prediction unit 208 is configured to generate a second user interface 806 as shown in FIG. 8B. FIG. 8B illustrates the second user interface 806 that depicts the set of potential churn customers. In an embodiment, the churn prediction unit 208 presents the plurality of attributes, such as attribute 1, attribute 2, and attribute 3, associated with each of the customers from the set of churner customers. In an embodiment, the churn prediction unit 208 presents the plurality of attributes, such as attribute 4, attribute 5, and attribute 6, associated with each of the customers from the set of potential churn customers.

The second user interface 806 provides a visualization of the set of potential churn customers to an analyst from an organization. The churn prediction unit 208 is configured to generate the visualization based on the similarity matrix. The visualization represents a node-to-node similarity among the plurality of customers. Thus, the visualization provides a holistic view of customer similarities and a distribution of the plurality of training nodes and the plurality of testing nodes. In an embodiment, the visualization displays the plurality of attributes associated with each of the customers from the set of potential churn customers. In an embodiment, the visualization enables the analyst to visualize the graph neighborhood associated with a particular customer node and thereby determine a set of potential attributes that contribute to the set of potential churn customers. Based on the visualization, the analyst takes one or more necessary measures to retain the set of potential churn customers. In an embodiment, the analyst offers one or more customized incentives to each customer of the set of potential churn customers. In an embodiment, the visualization enables the analyst to perform a qualitative assessment of the attributes associated with each of the customers from the set of potential churn customers.

A person skilled in the art will understand that the first user interface 802 and the second user interface 806 are for illustrative purposes and should not be construed to limit the scope of the disclosure.

A person skilled in the art will understand that the example of determining the set of potential churn customers from the plurality of customers has been provided for illustrative purposes and should not be construed to limit the scope of the disclosure.

In another implementation of the disclosed method and the system, a set of potential churn employees are determined based on the customer influence value associated with each of the employees from a plurality of employees in an organization.

In operation, the database server 102 is configured to receive data, associated with the plurality of employees, from a plurality of structured data sources, a plurality of semi-structured data sources, and a plurality of unstructured data sources, via the communication network 106. The database server 102 implements one or more data fusion techniques on the received data and stores the data in a structured manner. The structured data includes information related to the plurality of attributes associated with each of the plurality of employees. Examples of the plurality of attributes associated with each of the plurality of employees include, but not limited to, a number of years of experience, a designation of the employee, a salary of the employee, a number of candidates referred by the employee and the like. The application server 104 is configured to receive the structured data, which represents the plurality of attributes associated with each of the plurality of employees, from the database server 102, via the communication network 106.

In response to the data received from the database server 102, via the communication network 106, the application server 104 is configured to determine the incidence matrix. The application server 104 is configured to create the graph based on the determined incidence matrix. In an embodiment, the graph created by the application server 104 is a hypergraph. The application server 104 is further configured to determine the similarity matrix.

The "similarity matrix" defines a degree of connectivity between each of the plurality of employees. The similarity matrix is determined based on the diagonal node degree matrix, the diagonal edge degree matrix, and the diagonal edge weight matrix. The similarity matrix represented by L is determined in accordance with equation (1). The application server 104 is further configured to decompose the similarity matrix L into the first matrix and the second matrix based on one or more known in the art decomposition techniques. In an embodiment, the similarity matrix L is decomposed based on an Eigen decomposition technique. The eigen decomposition of the similarity matrix L is determined in accordance with equation (2).

The application server 104 is further configured to determine the third matrix, which alternatively is annotated as the heat kernel matrix. The application server 104 is further configured to determine the heat kernel matrix, represented by H(t), associated with the laplacian spectra based on the first matrix, the second matrix and the scaling parameter t. The scaling parameter t governs a degree of heat diffusion associated with each of the plurality of employees. The application server 104 determines the third matrix, also annotated as the heat kernel matrix, in accordance with equation (3).

Based on the determined heat kernel matrix, the application server 104 is configured to determine the set of potential churn employees from the plurality of employees. The application server 104 is configured to present the set of potential churn employees from the plurality of employees in the organization on the user-computing device 108. In an exemplary scenario, if an employee Z leaves the organization, then the employees having attributes similar to the employee Z are determined based on the similarity matrix. Further, the customer influence value of all the employees associated with the employee Z is determined by the churn prediction unit 208. Subsequently, the churn prediction unit 208 compares the customer influence value of each of the employees associated with the employee Z with the pre-defined threshold. Based on the comparison, the set of potential churn employees is determined.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to determine the set of potential churn customers. The at least one code section in an application server 104 causes the machine and/or computer to perform the steps, which comprises creating a graph that comprises the plurality of nodes and the plurality of edges. The graph is created such that at least one edge of the plurality of edges connects more than two nodes of the plurality of nodes. Each of the plurality of nodes in the graph represents a customer. The similarity matrix representative of a similarity between each of a plurality of customers, represented by the plurality of nodes, is determined based on the graph. Further, the similarity matrix is decomposed into the first matrix and the second matrix. The third matrix is determined based on the first matrix, the second matrix, and the scaling parameter. The third matrix is utilized to identify the set of potential churn customers from the plurality of customers. The set of potential churn customers is presented on the user-computing device 108.

Various embodiments of the disclosure encompass numerous advantages including methods and systems for predicting customer churn associated with a service of an organization. As discussed above, the disclosed methods and systems determines a customer's influence propagated among the plurality of customers. Based on the determined customer influence, the methods and systems determines the set of potential churn customers. In an embodiment, the set of potential churn customers is provided to the concerned managers and/or the human resources department to implement appropriate measures to retain the set of potential churn employees. In an embodiment, the methods and the systems disclosed herein provide a visual display of the attributes associated with the customer that are responsible for the customer churn. Based on the visual display, appropriate measure may be implemented to retain the customers. The disclosed methods and systems may be extensible in multiple industry domains with different churn prediction scenarios.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method of operating a customer service system, the method comprising:
    receiving, by a database server, customer data for a plurality of customers through a communication network from a user-computing device, the plurality of customers comprising a set of churner customers and a set of non-churner customers;
    fusing, by the database server, the customer data;
    storing, by the database server, the fused customer data;
    receiving, by the database server, a query from an application server through the communication network to extract the fused customer data, the application server comprising one or more processors;
    receiving, by the application server, the extracted customer data comprising a plurality of attributes through the communication network;
    defining, by the application server, a plurality of bins corresponding to the plurality of attributes using a density plot of numerical values of each attribute of the plurality of attributes;
    generating, by the application server, an incidence matrix, based on the plurality of attributes, comprising a plurality of rows and a plurality of columns, wherein each row of the plurality of rows represents a customer of the plurality of customers and the plurality of columns corresponds to the plurality of bins;
    creating, by the application server, a customer similarity graph comprising a plurality of customer nodes and a plurality of edges, wherein each edge represents a bin of the plurality of bins, at least one edge of the plurality of edges connects more than two customer nodes of the plurality of customer nodes, each of the plurality of customer nodes represents a customer, the plurality of customer nodes are located in graphical neighborhoods, the customer similarity graph is created based on the incidence matrix, and each edge of the plurality of edges is represented as an n-dimensional vector with binary entries;
    determining, by the application server, a similarity matrix representative of a similarity between each of the plurality of customers, represented by the plurality of customer nodes, based on the customer similarity graph;
    decomposing, by the application server, the similarity matrix into a first matrix and a second matrix;
    determining, by the application server, a third matrix based on the first matrix, the second matrix, and a scaling parameter, wherein the third matrix is a heat kernel matrix defining an effect of each of the plurality of customers on the other customers of the plurality of customers, and the scaling parameter represents a factor that defines a radius of a neighborhood to determine an influence of the customer propagated among the plurality of customers;
    receiving, by the application server, information comprising a first set of attributes from the plurality of attributes, the first set of attributes pertaining to a set of churner customers from the plurality of customers, who have left the service during a pre-defined time interval through the communication network from the user-computing device, and a second set of attributes from the plurality of attributes pertaining to a set of non-churner customers from the plurality of customers;
    determining, by the application server, a set of potential churn customers based on:
        the third matrix comprising the effect of the customer on the other customers in the radius of the neighborhood and the influence of the customer that propagated, and
        the information comprising the first set of attributes pertaining to the set of churner customers;
    receiving, by the user-computing device from the application server through the communication network, the set of potential churn customers; and
    visualizing, through a graphical interface on the user-computing device, the set of potential churn customers on the customer similarity graph, the plurality of customer nodes comprising churner customer nodes, non-churner customer nodes, and potential churn customer nodes located in the graphical neighborhoods relative to the radius, the potential churn customers comprising a third set of attributes from the plurality of attributes, the third set of attributes pertaining to the set of potential churn customers and based on:
        the first set of attributes of the churner customers,
        the second set of attributes of the non-churner customers,
        the scaling parameter with respect to the potential churn customers relative the churner customers, and
        the scaling parameter with respect to the potential churn customers relative to the non-churner customers,
    wherein the visualization configured to assist a user in retaining the set of potential churn customers.

2. The method of claim 1, wherein determining the set of potential churn customers comprises:
    creating, by the application server, a fourth matrix, comprising a first value or a second value assigned to the plurality of customers, based on the information pertaining to the set of churner customers, the first value being assigned to the set of non-churner customers, and the second value being assigned to the set of churner customers;

determining, by the application server, a customer influence value associated with each customer in the plurality of customers based on the third matrix and the fourth matrix; and comparing, by the application server, the customer influence value associated with each customer in the plurality of customers with a pre-defined threshold to identify the set of potential churn customers from the plurality of customers.

3. The method of claim 1, further comprising:
receiving, by the application server, an updated fourth matrix, from the user-computing device; and
updating the set of potential churn customers based on the updated fourth matrix.

4. The method of claim 1, further comprising assigning, by the application server, a weight to an edge, from the plurality of edges, wherein the weight represents a measure of similarity between a set of customers, from the plurality of customers, encompassed by the edge in the graph; wherein the weight assigned to the edge is less in comparison to a weight assigned to each of remaining edges in the plurality of edges, when a number of nodes encompassed by the edge is greater than a pre-defined threshold.

5. The method of claim 1, wherein the plurality of attributes comprises at least one of a customer gender, a customer geography, a customer age, a customer annual billing amount, a customer service type, a customer industry type, a customer voice usage, a customer data usage, a number of years of a customer with association with a bank, a customer account type, a customer credit limit, and a customer annual spending amount.

6. The method of claim 1, further comprising generating, by the application server, a histogram indicative of the density plot associated with each of the plurality of attributes received.

7. The method of claim 1, wherein the density plot represents a relationship between a number of customers of the plurality of customers and an attribute of the plurality of attributes, each bin of the plurality of bins has an equal number of customers, and the number of bins is greater in areas of higher density of the density plot.

8. The method of claim 1, wherein the customer similarity graph comprising training nodes and testing node, the training nodes comprising the churner customer nodes and the non-churner customer nodes, and the testing nodes comprising the potential churn customer nodes.

9. A customer service system comprising:
a database server configured to:
receive customer data for a plurality of customers through a communication network from a user-computing device, the plurality of customers comprising a set of churner customers and a set of non-churner customers,
fuse the customer data,
store the fused customer data;
receive a query from an application server through the communication network to extract the fused customer data, the application server comprising one or more processors;
an application server configured to:
receive the extracted customer data comprising a plurality of attributes through the communication network,
define a plurality of bins corresponding to the plurality of attributes using a density plot of numerical values of each attribute of the plurality of attributes,
generate an incidence matrix, based on the plurality of attributes, comprising a plurality of rows and a plurality of columns, wherein each row of the plurality of rows represents a customer of the plurality of customers and the plurality of columns corresponds to the plurality of bins,
create a customer similarity graph that comprises a plurality of customer nodes and a plurality of edges, wherein each edge represents a bin of the plurality of bins, at least one edge of the plurality of edges connects more than two customer nodes of the plurality of customer nodes, each of the plurality of customer nodes represents a customer, the plurality of customer nodes are located in graphical neighborhoods, the customer similarity graph is created based on the incidence matrix, each edge of the plurality of edges is represented as an n-dimensional vector with binary entries, and the plurality of edges represents a plurality of attributes associated with the plurality of customers,
determine a similarity matrix representative of a similarity between each of a plurality of customers, represented by the plurality of customer nodes, based on the customer similarity graph,
decompose the similarity matrix into a first matrix and a second matrix,
determine a third matrix based on the first matrix, the second matrix, and a scaling parameter, wherein the third matrix is a heat kernel matrix defining an effect of each of the plurality of customers on the other customers of the plurality of customers, and the scaling parameter represents a factor that defines a radius of neighborhood to determine an influence of the customer propagated among the plurality of customers;
receive information comprising a first set of attributes from the plurality of attributes, the first set of attributes pertaining to a set of churner customers from the plurality of customers, who have left the service during a pre-defined time interval through the communication network from the user-computing device, and a second set of attributes from the plurality of attributes pertaining to a set of non-churner customers from the plurality of customers,
determine a set of potential churn customers based on:
the third matrix comprising the effect of the customer on the other customers in the radius of the neighborhood and the influence of the customer that propagated, and
the information comprising the first set of attributes pertaining to the set of churner customers; and
a user computing device configured to:
receive from the application server through the communication network, the set of potential churn customers; and
visualize the set of potential churn customers through a graphical interface on the user-computing device on the customer similarity graph, the plurality of customer nodes comprising churner customer nodes, non-churner customer nodes, and potential churn customer nodes located in the graphical neighborhoods relative to the radius, the potential churn customers comprising a third set of attributes from the plurality of attributes, the third set of attributes pertaining to the set of potential churn customers and based on:
the first set of attributes of the churner customers,
the second set of attributes of the non-churner customers,
the scaling parameter with respect to the potential churn customers relative the churner customers, and
the scaling parameter with respect to the potential churn customers relative to the non-churner customers,
the visualization configured to assist a user in retaining the set of potential churn customers.

10. The application server of claim 9, wherein the application server is further configured to determine the set of potential churn customers by:
creating a fourth matrix comprising a first value or a second value assigned to the plurality of customers, based on the set of churner customers, the first value being assigned to the set of non-churner customers, and the second value being assigned to the set of churner customers;
determining, by the application server, a customer influence value associated with each customer in the plurality of customers based on the third matrix and the fourth matrix; and
comparing, by the application server, the customer influence value associated with each customer in the plurality of customers with a pre-defined threshold to identify the set of potential churn customers from the plurality of customers.

11. The application server of claim 10, wherein the application server is further configured to:
receive an updated fourth matrix from the user-computing device; and
update the set of potential churn customers based on the updated fourth matrix.

12. The application server of claim 10, wherein the application server is further configured to assign a weight to an edge, from the plurality of edges, wherein the weight represents a measure of similarity between a set of customers, from the plurality of customers, encompassed by the edge in the graph, and the weight assigned to the edge is less in comparison to a weight assigned to each of remaining edges in the plurality of edges, when a number of nodes encompassed by the edge is greater than a pre-defined threshold.

13. The system of claim 9, wherein the plurality of attributes comprises at least one of a customer gender, a customer geography, a customer age, a customer annual billing amount, a customer service type, a customer industry type, a customer voice usage, a customer data usage, a number of years of a customer with association with a bank, a customer account type, a customer credit limit, and a customer annual spending amount.

14. The system of claim 9, wherein the application server is further configured to generate a histogram indicative of the density plot associated with each of the plurality of attributes received.

15. The system of claim 9, wherein the density plot represents a relationship between a number of customers of the plurality of customers and an attribute of the plurality of attributes, each bin of the plurality of bins has an equal number of customers, and the number of bins is greater in areas of higher density of the density plot.

16. The system of claim 9, wherein the customer similarity graph comprising training nodes and testing node, the training nodes comprising the churner customer nodes and the non-churner customer nodes, and the testing nodes comprising the potential churn customer nodes.

17. A non-transitory computer-readable storage medium having stored thereon, a set of computer-executable instructions for causing a customer service system, the system comprising a database server, a communication network, a user-computing device, and an application server comprising one or more processors, to perform steps comprising:
receiving, by a database server, customer data for a plurality of customers through a communication network from a user-computing device, the plurality of customers comprising a set of churner customers and a set of non-churner customers;
fusing, by the database server, the customer data;
storing, by the database server, the fused customer data;
receiving, by the database server, a query from an application server through the communication network to extract the fused customer data, the application server comprising one or more processors;
receiving, by the application server, the extracted customer data comprising a plurality of attributes through the communication network;
defining, by the application server, a plurality of bins corresponding to the plurality of attributes using a density plot of numerical values of each attribute of the plurality of attributes;
generating, by the application server, an incidence matrix, based on the plurality of attributes, comprising a plurality of rows and a plurality of columns, wherein each row of the plurality of rows represents a customer of the plurality of customers and the plurality of columns corresponds to the plurality of bins;
creating, by the application server, a customer similarity graph comprising a plurality of customer nodes and a plurality of edges, wherein each edge represents a bin of the plurality of bins, at least one edge of the plurality of edges connects more than two customer nodes of the plurality of customer nodes, each of the plurality of customer nodes represents a customer, the plurality of customer nodes are located in graphical neighborhoods, the customer similarity graph is created based on the incidence matrix, each edge of the plurality of edges is represented as an n-dimensional vector with binary entries, and the plurality of edges represents a plurality of attributes associated with the plurality of customers;
determining, by the application server, a similarity matrix representative of a similarity between each of a plurality of customers, represented by the plurality of customer nodes, based on the customer similarity graph;
decomposing, by the application server, the similarity matrix into a first matrix and a second matrix;
determining, by the application server, a third matrix based on the first matrix, the second matrix, and a scaling parameter, wherein the third matrix is a heat kernel matrix defining an effect of each of the plurality of customers on the other customers of the plurality of customers, and the scaling parameter represents a factor that defines a radius of neighborhood to determine an influence of the customer propagated among the plurality of customers;
receiving, by the application server, information comprising a first set of attributes from the plurality of attributes, the first set of attributes pertaining to a set of churner customers from the plurality of customers, who have left a service associated with an organization during a pre-defined time interval, and a second set of attributes from the plurality of attributes pertaining to a set of non-churner customers from the plurality of customers;

determining, by the application server, a set of potential churn customers based on:
- the third matrix comprising the effect of the customer on the other customers in the radius of the neighborhood and the influence of the customer that propagated, and
- the information comprising the first set of attributes pertaining to the set of churner customers;

receiving, by the user-computing device from the application server through the communication network, the set of potential churn customers; and visualizing the set of potential churn customers through a graphical interface on user-computing device on the customer similarity graph, the plurality of customer nodes comprising churner customer nodes, non-churner customer nodes, and potential churn customer nodes located in the graphical neighborhoods relative to the radius, the potential churn customers comprising a third set of attributes from the plurality of attributes, the third set of attributes pertaining to the set of potential churn customers and based on:
- the first set of attributes of the churner customers,
- the second set of attributes of the non-churner customers,
- the scaling parameter with respect to the potential churn customers relative the churner customers, and
- the scaling parameter with respect to the potential churn customers relative to the non-churner customers,
- the visualization configured to assist a user in retaining the set of potential churn customers.

18. The non-transitory computer-readable storage medium of claim 17, wherein the plurality of attributes comprises at least one of a customer gender, a customer geography, a customer age, a customer annual billing amount, a customer service type, a customer industry type, a customer voice usage, a customer data usage, a number of years of a customer with association with a bank, a customer account type, a customer credit limit, and a customer annual spending amount.

19. The non-transitory computer-readable storage medium of claim 17, wherein determining the set of potential churn customers further comprises:
- creating, by the application server, a fourth matrix, comprising of a first value or a second value assigned to the plurality of customers, based on the information pertaining to the set of churner customers, the first value being assigned to the set of non-churner customers, and the second value being assigned to the set of churner customers;
- determining, by the application server, a customer influence value associated with each customer in the plurality of customers based on the third matrix and the fourth matrix; and
- comparing, by the application server, the customer influence value associated with each customer in the plurality of customers with a pre-defined threshold to identify the set of potential churn customers from the plurality of customers.

20. The non-transitory computer-readable storage medium of claim 17, wherein the steps further comprise generating, by the application server, a histogram indicative of the density plot associated with each of the plurality of attributes received.

21. The non-transitory computer-readable storage medium of claim 17, wherein the density plot represents a relationship between a number of customers of the plurality of customers and an attribute of the plurality of attributes, each bin of the plurality of bins has an equal number of customers, and the number of bins is greater in areas of higher density of the density plot.

22. The non-transitory computer-readable storage medium of claim 17, wherein the customer similarity graph comprising training nodes and testing node, the training nodes comprising the churner customer nodes and the non-churner customer nodes, and the testing nodes comprising the potential churn customer nodes.

* * * * *